US007281100B2

(12) United States Patent
Richard et al.

(10) Patent No.: US 7,281,100 B2
(45) Date of Patent: Oct. 9, 2007

(54) DATA PROCESSING SYSTEM AND METHOD

(75) Inventors: Bruno Richard, Crolles (FR); Denis Chalon, Grenoble (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 409 days.

(21) Appl. No.: 10/857,022

(22) Filed: Jun. 1, 2004

(65) Prior Publication Data

US 2005/0033931 A1 Feb. 10, 2005

(30) Foreign Application Priority Data

Jun. 2, 2003 (EP) ................... 03291313

(51) Int. Cl.
*G06F 12/00* (2006.01)
(52) U.S. Cl. .................. 711/162; 711/161; 711/151
(58) Field of Classification Search .............. None
See application file for complete search history.

(56) References Cited

U.S. PATENT DOCUMENTS

| 5,907,673 | A | * | 5/1999 | Hirayama et al. ............ 714/16 |
| 6,016,529 | A | * | 1/2000 | Woodman ................. 711/3 |
| 6,374,363 | B1 | * | 4/2002 | Wu et al. ................ 714/6 |
| 6,430,593 | B1 | * | 8/2002 | Lindsley ................ 718/103 |
| 6,611,850 | B1 | * | 8/2003 | Shen .................... 707/204 |
| 6,836,830 | B1 | * | 12/2004 | Yamagami et al. ......... 711/162 |
| 6,907,506 | B2 | * | 6/2005 | Proidl .................. 711/162 |
| 7,055,059 | B2 | * | 5/2006 | Yanai et al. ............. 714/7 |
| 2002/0059309 | A1 | * | 5/2002 | Loy et al. ............. 707/200 |

FOREIGN PATENT DOCUMENTS

| EP | 0869437 | 10/1998 |
| WO | WO9724668 | 7/1997 |

OTHER PUBLICATIONS

"Timely Policy-Based Event-Driven Backups of Critical Files", IBM Technical Disclosure Bulletin, Apr. 1996, pp. 127-129, vol. 39, No. 4, XP 000587447, IBM Corp. New York, US.

* cited by examiner

*Primary Examiner*—Mano Padmanabhan
*Assistant Examiner*—Thanh D. Vo

(57) ABSTRACT

Embodiments of the present invention provide a data processing method for saving data stored within a portion of a memory associated with a first process executable by a data processing system; the method comprising the steps of: executing, substantially concurrently or substantially in parallel under control of a scheduler, a first process, with a respective execution priority, to perform a data processing task using a current portion of the memory and a backup process, having a respective execution priority, to create a back-up copy of data stored within the memory during the performance of that data processing task; the backup process being executable in response to a predeterminable event associated with the first process; and creating a back-up copy of the data in response to the predeterminable event associated with the first process.

7 Claims, 4 Drawing Sheets

DATA PROCESSING SYSTEM AND METHOD

FIELD OF THE INVENTION

The present invention relates to a data processing system and method and, more particularly, to a data processing system and method for performing a back-up operation of data or memory associated with an extensive data processing task.

BACKGROUND TO THE INVENTION

Many data processing tasks take a considerable amount of time and data processing resources to implement. In many instances, any such processing may take hours, days or, perhaps, even weeks. Often a cluster of data processing engines undertakes such data processing tasks. Each engine works on an atomic data processing task to produce corresponding results. Additionally, or alternatively, a massively parallel computer system can be used to perform such tasks with each processor within such a system being assigned respective atomic data processing tasks.

It can be appreciated that it would be undesirable if a machine performing such a task, or part of such a task, failed. Therefore, it is known within the art to implement a technique known as check pointing in which the data processing task is frozen or temporarily suspended while a complete back-up copy is created of the results, or partial results, thus far. Therefore, if a fault occurs, the previously saved results or partial results, also known as a memory image or picture, are loaded and processing recommences using those results or partial results rather than the whole job or data processing task having to be performed from scratch.

While the above described prior art technique is able to accommodate hardware or software failures that would, but for the technique, lead to a loss of data processing results and a need to restart the data processing task from scratch, it is undesirable to have to suspend the data processing operation while such a memory dump is performed. This is particularly so in the case where the data processing task is distributed across a number of machines. In such a situation all of the machines, in the worst case, or some of the machines interacting with a machine currently undertaking such check pointing, also have to suspend their operations. Therefore, check pointing undertaken by one machine might entail suspending operations on other machines.

It is an object of embodiments of the present invention at least to mitigate some of the problems of the prior art.

SUMMARY OF INVENTION

Accordingly, a first aspect of embodiments of the present invention provides a data processing method for saving data stored within a portion of a memory associated with a first process executable by a data processing system; the method comprising the steps of: executing, using at least common resources, substantially concurrently or substantially in parallel, the first process, with a respective execution priority, to perform a data processing task using a current portion of the memory and a back-up process, having a respective execution priority, to create a back-up copy of data stored within the memory during the performance or pendancy of that data processing task; the back-up process being executable in response to a pre-determined event associated with the first process; and creating at least a partial back-up copy of the data in response to the pre-determinable event associated with the first process.

Advantageously, due to the relative execution priorities of the first process and the back-up process, the back-up process can be arranged to be executing continuously in the background, that is, a scheduler can be arranged, during periods of temporary suspension of the data processing task, or first process, such that the back-up process is executed. Therefore, when the first process encounters a delay such as, for example, a communication delay or a device delay when, for example, writing to or reading from an HDD or outputting data for transmission over a network, the first process will be temporarily suspended and the processing capacity or resources of the system can be made available to the back-up process, which continues its back-up operations until the first process is re-started. This is in contrast to the prior art in which the whole of the back-up process is completed before execution of the main processing task is allowed to resume.

Embodiments provide a data processing method for saving data stored within a portion of a memory associated with a first process executable by a data processing system; the method comprising the steps of: executing, using at least common resources, substantially concurrently or substantially in parallel under control of a scheduler, a first process, with a respective execution priority, to perform a data processing task using a current portion of the memory and a backup process, having a respective execution priority, to create a back-up copy of data stored within the memory during the performance of that data processing task; the backup process being executable in response to a predeterminable event associated with the first process; and creating a back-up copy of the data in response to the predeterminable event associated with the first process.

Embodiments preferably provide a method in which the predeterminable event is associated with, or detection of, at least one of a period during which the first process is in a waiting state, a period of inactivity associated with the first process, a period during which the first process is temporarily suspended but still pending.

Embodiments provide a method in which the first process has performed an operation to which a response is required. For example, the operation might be at least one of a read or write operation or some other operation.

Preferably, embodiments of the present invention provide a method in which the step of creating the back-up copy of the data stored within the memory comprises the step of progressively traversing the memory to create a back-up copy of a respective portion of the memory; the respective portion, preferably, being different to the current portion of the memory used by the first process.

Preferred embodiments provide a method further comprising the step of detecting an event associated with a memory access to the current portion of the memory used by the first process and creating a back-up copy of that current portion of the memory.

A further aspect of embodiments of the present invention provides a back-up method for a data processing system comprising the steps of progressively or incrementally creating back-up copies of respective portions of data or memory associated with a first process and, in response to an interrupt or an event, temporarily suspending the progressive or incremental back-up process and performing an asynchronous back-up of an identifiable portion of memory associated with the interrupt or event.

A further aspect of embodiments of the present invention provides an interrupt driven back-up process comprising the steps of performing a progressive or incremental back-up of a portion of memory and responding to an interrupt to back-up a portion of memory other than the respective portions of memory associated with a memory operation of a first process.

Preferably, embodiments provide a method comprising the step of changing a read-write status of a current portion of memory to a read-only status; and in which the step of detecting the event comprises a step of detecting a write attempt to the read-only current portion of the memory.

Preferred embodiments provide a method further comprising the step of varying the relative execution priorities of the first process and the back-up process such as, for example, increasing the execution priority of the back-up process in response to detection of a period of micro-inactivity or in response to detection of a page fault to allow the back-up process to resume or to be performed.

Embodiments, preferably, provide an interrupt driven back-up process comprising the steps of initiating and performing a first back-up process; interrupting the first back-up process to perform a second asynchronous or non-sequential back-up process; and resuming the first back-up process having performed or completed the second back-up process.

Preferred embodiments are provided in which the step of varying comprises the step of establishing an execution priority for the back-up process that is greater than the execution priority of the first process. Preferably, the step of varying comprises the step of establishing relative execution priorities for the first process and the back-up process such that the back-up process execution priority is greater than the execution priority of the first process.

Preferred embodiments provide a method in which the step of varying is responsive to detection of the predeterminable event associated with the first process or the memory access to the current portion of the memory used by the first process.

Preferably, embodiments provide a method further comprising the step of installing a page fault handler associated with the memory; the page fault handler being responsive to detection of an event to perform the step of saving a copy of the page associated with the event and to write to the page associated with the event following said saving.

A further aspect of embodiments of the present invention provides a data processing method for creating a back-up copy of data stored within a memory associated with a first process; the method comprising the steps of progressively or incrementally creating a back-up copy of serial or sequential portions of the memory in response to an event associated with the first process; and interrupting the progressive or incremental back-up process to perform an asynchronous, that is, non serial or sequential, back-up of a further portion of the memory; the further portion of the memory being different to the serial or sequential portions of the memory.

A still further aspect of embodiments of the present invention provides a system comprising means to implement a method as claimed or described herein.

Embodiments provide a computer program for saving data stored within a portion of a memory associated with a first process executable by a data processing system; the program comprising computer executable code for executing, using at least common resources, substantially concurrently or substantially in parallel under control of a scheduler, a first process, with a respective execution priority, to perform a data processing task using a current portion of the memory and a backup process, having a respective execution priority, to create a back-up copy of data stored within the memory during the performance of that data processing task; the backup process being executable in response to a predeterminable event associated with the first process; and computer executable code for creating a back-up copy of the data in response to the predeterminable event associated with the first process.

Embodiment provide a computer program for creating a back-up copy of data stored within a memory associated with an on-going or currently executing first process; the program comprising computer executable code means to progressively or incrementally create a back-up copy of at least a portion of the memory in response to an event associated with the first process. Further embodiments provide a computer program or computer program element comprising computer executable code to implement a method or system as described or claimed herein. Preferably, embodiments provide a computer program product comprising computer readable storage storing such a computer program or computer program element.

BRIEF DESCRIPTION OF THE DRAWINGS

Embodiments of the present invention will now be described, by way of example only, with reference to the accompanying drawings in which.

DETAILED DESCRIPTION OF THE PREFERRED EMBODIMENTS

Figure 1:
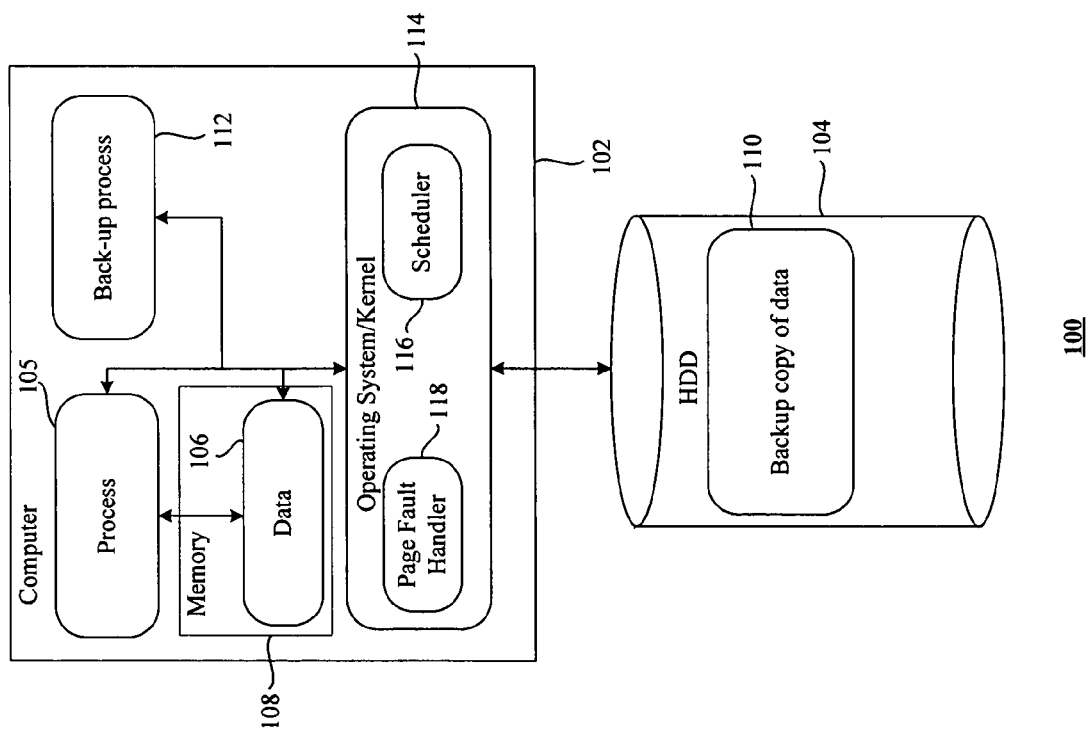
FIG. 1 shows, schematically, a data processing system according to an embodiment.

FIG. 1 shows, schematically, a data processing system 100 according to an embodiment. The data processing system 100 comprises a computer system 102 and, preferably, non-volatile storage 104 or at least to such storage. Preferably, the non-volatile storage takes the form of an HDD. The computer system 102 comprises a first process 105 for performing a data processing task. The first process 105 generates data 106 that are stored within a memory 108 of the data processing system 100. The non-volatile storage 104 stores a back-up copy 110 of the data 106. A back-up process 112 creates the back-up 110 copy of the data 106.

The computer system 102 also comprises an operating system or OS kernel 114 that has, amongst other things, an execution scheduler 116 and a page fault handler 118. The execution scheduler 116 manages the use of the resources of the computer system 102 to allow the first process 105 and the back-up process 112 to execute ostensibly in parallel. In effect, the scheduler 116 implements or realizes a multitasking or multi-threaded data processing environment. The scheduler 116 is arranged to attribute a relatively high execution priority to the first process 105 and a relatively low execution priority to the back-up process 112. The scheduler 116 assigns the relative execution priorities to the first process 105 and the back-up process 112 such that the first process 105 is given access to the resources (not shown) of the computer system while that process 105 needs those resources. On occasions when the first process 105 does not need the resources of the computer system 102, that is, on occasions when the processing performed by the first process 105 is temporarily suspended, the resources of the computer system 102 are made available to the back-up process 112. The first process 105 is said to be pending, that is, still scheduled for execution by the scheduler 116 but in a waiting state from the perspective of the scheduler. In preferred embodiments, the waiting state of the first process 105 represents an embodiment of a predetermined or pre-determinable event associated with the first process. In preferred embodiments, the suspended, but still scheduled, first process, remains in this waiting state until a predetermined event occurs. As mentioned above, such a predetermined event might relate to a device response. This is in contrast to the prior art in which the first process 105 would be de-scheduled during back-up or check pointing until the whole of the back-up process has been completed.

It will be appreciated that the computer system 102 also comprises a processor, as is conventional, for executing the various software elements described above or in this specification.

The back-up process 112 is arranged to create, incrementally or progressively, the back-up copy 110 of the data 106 during periods for which it is granted access to the computing resources of the computer system 102 by the scheduler 116. In preferred embodiments, the back-up software 112 saves the data 106 by saving respective pages (not shown) of the memory 108 associated with, or used by, the first process 105. The back-up process 112 saves as many of those pages as possible using the resources and time granted to it by the scheduler 116. The back-up process 112 is arranged to perform the back-up process serially or sequentially by saving the data of the first process 105 in the order in which the data was produced. The information saved by the back-up process 112 is, in preferred embodiments, an exact copy of the memory image, or at least a portion, such as, for example, a page, of the memory image.

The periods for which the back-up process 112 is granted access to the computing resources of the computer system 102 are those for which the first process 105 is temporarily suspended. These periods, known as periods of micro-inactivity, typically occur when the first process 105 has performed an operation for which a response is required. For example, the first process may have instigated a read or write operation to a device and that read or write operation will take a specific period of time. If the first process 105 is unable to continue until confirmation of that operation has been received or until data associated with that operation has been received, the processing performed by the first process 105 will be temporarily suspended. It will be appreciated that such periods of inactivity do not represent a suspension or freezing of the first process 105 in the sense of the above described prior art check pointing technique since the first process 105 is still executing or pending from the perspective of the user or the scheduler and that it is merely in a waiting state.

The page fault handler 118, according to embodiments of the present invention, responds to page faults associated with the first process 105 by storing, on the HDD 104, a copy (not shown) of the page of memory identified by the page fault. Preferably, the copy of the defaulting page is stored as part of the copy 110 of the data 106. It can be appreciated that the page fault handler 118 represents an embodiment of an interrupt-driven back-up process that supplements or augments the serial or sequential back-up process performed by the back-up process 112.

Figure 2:
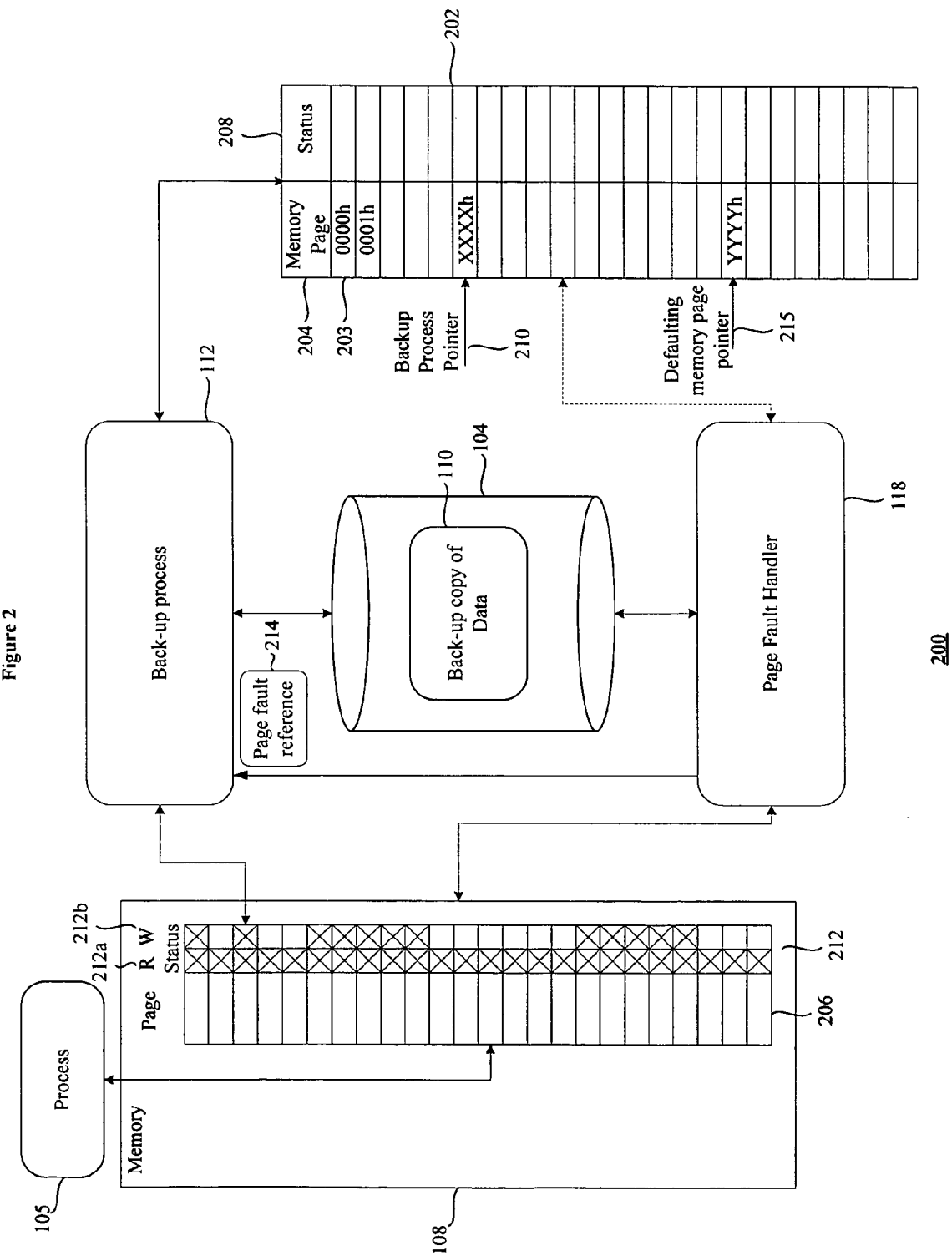
FIG. 2 depicts back-up operations associated with the data processing system shown in FIG. 1.

FIG. 2 shows the processing 200 performed by the elements of the data processing system 100 shown in FIG. 1. The back-up process 112 comprises, or has access to, a table 202 containing identifiers 204 of the pages 206 of the memory 108 associated with the first process 105 together with respective status indicia 208. The status indicia 208 provide an indication to the back-up process 112 of whether or not corresponding pages of memory 206, identified by the respective memory page identifiers 204, have been backed-up.

The back-up process 112 uses a back-up process pointer 210 to step through or traverse the table 204 progressively or incrementally and to create, in a similar progressive or incremental manner, back-up copies of respective pages of memory 206, starting with the first entry 203 of the table 202. It will be appreciated that the back-up copy 110 of the data 106 is created by the back-up process 112 progressively and, preferably, in discrete units, which are, in preferred embodiments, pages 206 of the memory 108.

Preferably, the back-up process 112 modifies the read/write status flags 212 associated with the pages 206 of memory 108 such that they are read only. The first flag 212a represents the current writeable status of the memory prior to the change made by the back-up process. The second flag 212b represents the original writeable status of the page. Therefore, for example, if a page was intended to be read-only, the first and second flags would be set to RO and the first process would not be allowed to write to those protected pages. Another example is if a page is intended to be read-write, the second flag is set to RW and the first flag is switched from RW to RO. This arrangement will trigger a page fault if a write by the first process 105 is performed. In any event, once a page has been written to memory by the back-up process, the first flag (current writeable status) is set back to the second flag's value (original writeable status).

The page fault handler 118 is arranged to respond to a write operation instigated by the first process 105 to one of the read-only memory pages 206 by creating, or causing the back-up process 112 to create, a back-up copy of the page associated with, or identified by, the page fault exception. The page fault handler 118 represents an embodiment of a detector for detecting and responding to page faults. Preferably, the page fault handler 118 passes a reference 214 or identifier of the defaulting memory page to the back-up process 112 to make a non-sequential or asynchronous back-up of the defaulting page of memory. It can be appreciated that the back-up process 112 is shown as processing a page identified by a notional hexadecimal address, XXXXh, and the page fault handler 118 is shown as processing a different page identified by a different notional hexadecimal address, YYYYh. The reference 214 is used by a defaulting memory page pointer 215 to access the defaulting page and to record in the table 202 appropriate status information 208 showing the defaulting page to have been backed-up.

In preferred embodiments, the page fault handler 118 replaces the conventional OS page fault handler. The replacement is preferably at least for the duration of the back-up process. Upon completion of the back-up process, the original page fault handler can be re-installed or reactivated. The page fault handler preferably re-installs the original or a conventional page fault handler upon receiving an indication from the back-up process 112 that the back-up operation has been completed. Alternatively, the back-up process 112 itself might be responsible for commissioning and decommissioning the appropriate page fault handlers. The page fault handler 118 or the back-up process 112, coupled with the processor might represent embodiments of an installer. Therefore, the first process might be interrupted by the back-up process during a period other than a period of micro-inactivity when the OS or backup process installs the new handler 118. Furthermore, it will be appreciated that the handler 118 can be arranged to respond to page faults generated by or associated with only the first process 105 in preferred embodiments. Still further, page faults associated with processes other than the first process are handled conventionally.

Figure 3:
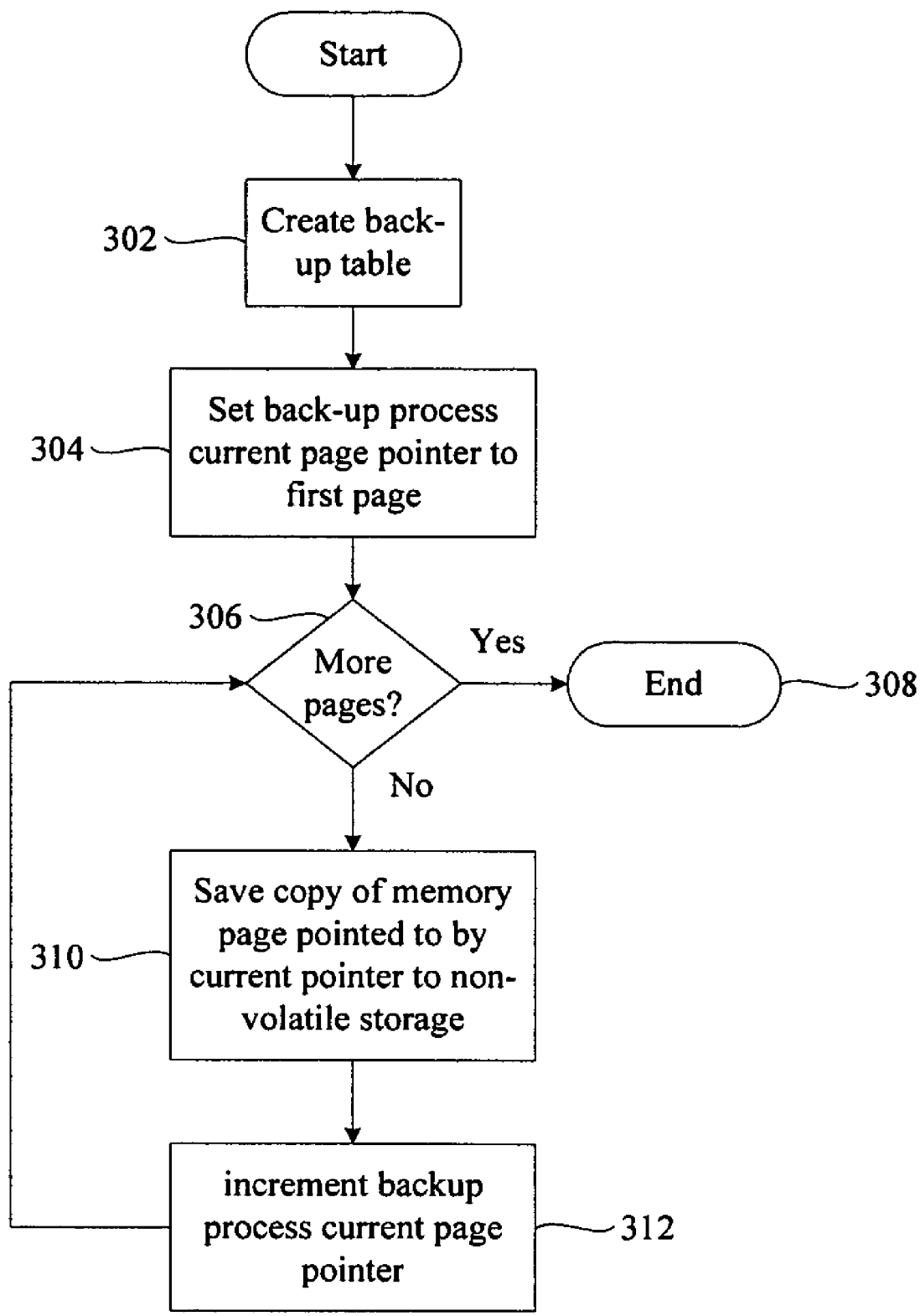
FIG. 3 shows, schematically, a basic back-up process according to an embodiment.

FIG. 3 shows a flowchart 300 of the processing steps performed by the data processing system 100 according to a basic embodiment. The back-up table 202, containing the list of the identifiers 204 of memory pages 206 associated with the first process 105, together with the status information 208, showing whether or not the corresponding pages 206 have been backed-up, is created at step 302. The back-up process pointer 210 is initialized point to the first memory page identifier 203 stored within the table 202 at step 304. A test is performed, at step 306, to determine whether or not all of the pages 206 of memory 108 associated with the first process 105 have been backed-up. If all pages 206 of memory 108 associated with the first process 105 have been backed-up, the check pointing or back-up operation is deemed to be complete and processing terminates at step 308. If the determination at step 306 is negative, the back-up process 112, at step 310, creates a back-up copy of the page 206 of memory 108 identified by the memory page identifier 204 pointed to by the back-up process pointer 210. The back-up process pointer 210 is incremented at step 312 so that it points to the next memory page identifier in the list of memory page identifiers. Processing then returns to step 306 where the test to determine whether or not there are further memory pages 206 to back-up is performed again. Steps 306, 310 and 312 are performed until all pages of memory 206 have been backed-up, that is, until all memory pages associated with the first process 105 have been backed-up.

It will be appreciated that the back-up process 112, due to its execution priority relative to that of the first process 105, will perform the back-up of the memory pages 206 in a sequential or progressive manner that might be sporadic according to the demands placed upon the resources of the computer system 102 by the first process 105, which, in turn, influences the availability of those resources to the back-up process 112.

Figure 4:
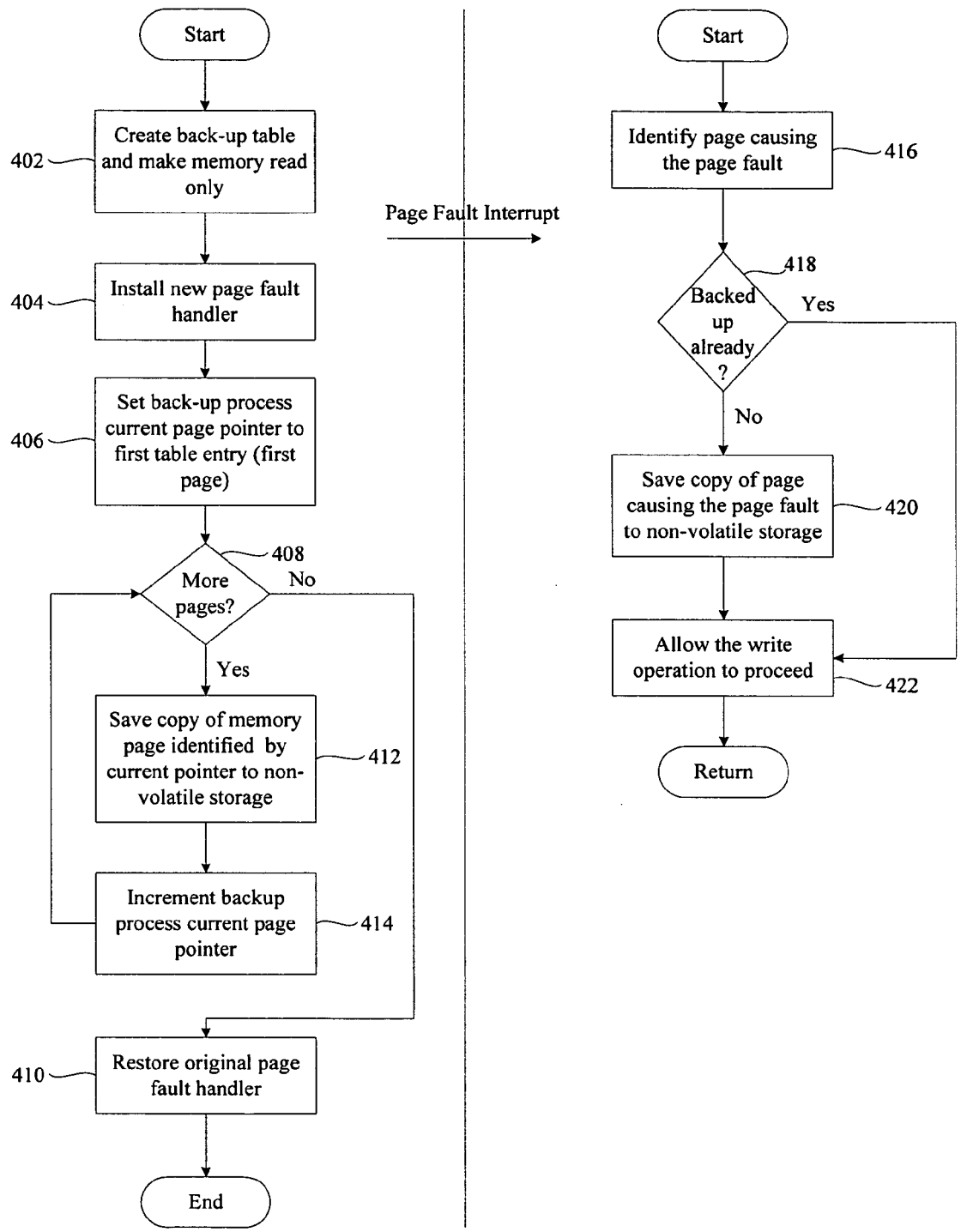
FIG. 4 shows an interrupt-driven back-up process according to a second embodiment.

FIG. 4 depicts a pair of flowcharts 400 of a back-up process according to a second embodiment. The back-up table 202 is created at step 402. Also performed at step 402 is a process for making all, or at least some, of the memory pages 206 associated with the first process 105 read-only. This is achieved by changing the read/write status flags 212 accordingly. An optional step of replacing a current page fault handler, different to the page fault handler 118, with the page fault handler 118 of the embodiments of the present invention is performed at step 404. The back-up process current page pointer 210 is initialized, at step 406, to point to the first entry 203 in the table 202. A test is performed, at step 408, to determine whether the table 202 contains identifiers 204 for memory pages 206 that have not been backed-up. If it is determined, at step 408, that there are no more pages to be backed-up, processing proceeds to the optional step of 410 where the original page fault handler is restored thereby replacing the page fault handler 118 according to an embodiment of the present invention.

If the test performed at step 408 shows that there are further pages 206 of memory 108 to be backed-up, the back-up process 112 creates a copy of the memory page 206 identified by the back-up process current pointer 210. The back-up process current page pointer 210 is incremented at step 414 to point to the next memory page identifier 204 contained within the table 202. Processing then returns to step 408 where the test is performed again.

Since the memory pages 206 associated with the first process 105 were made read only at step 402, any attempt made by the first process 105 to write to those pages will generate a page fault interrupt that is handled by the newly installed page fault handler 118. The processing shown by the left-hand flowchart of FIG. 4 continues until all of the memory pages 206 have been backed-up, the processing resources of the computer system are returned to the first process 105 or the page fault handler 118 interrupts that back-up process to perform an asynchronous back-up process; the steps of which are shown in the right-hand flowchart of FIG. 4.

Still referring to FIG. 4, the page causing the page fault is identified to the back-up process 112 at step 416. A determination is made at step 418 as to whether or not the page associated with the page fault has already been backed-up using the appropriate status information 208 stored within the back-up table 202. If it is determined that a back-up of the page associated with the page fault has already been created, the write operation to that page is allowed to proceed at step 422. If it is determined from the status information 208 that the memory page associated with the page fault has not already been backed-up, a back-up copy of that page is created at step 420. Once a back-up copy of the memory page 206 causing, or associated, with the page fault has been created, the write operation is allowed to proceed at step 422.

It will be appreciated that the back-up process is arranged to produce, progressively or incrementally, a complete snapshot or memory image of the memory used by the first process as it was at the point in time when the back-up process was commenced. This is desirable to preserve the atomicity of the back-up process or snapshot. Therefore, the back-up process 112 saves a page of memory that is about to be modified before it is actually modified to preserve the memory image of that page as it was when the back-up process commenced. Having completed the asynchronous back-up process shown in the right-hand flowchart of FIG. 4, processing returns to the appropriate point within the serial or sequential back-up process shown in the left-hand flowchart of FIG. 4 or, if the page fault occurred while the first process was running, processing returns to the first process 105. It will be appreciated that the back-up process is able to keep track of the pages that have been backed-up via the handler 118 to ensure that the atomicity of the back-up is preserved, that is, to ensure that a page previously backed-up by the handler 118 is not also backed-up by the back-up process 112.

Although the above embodiments have been described with reference to the page fault handler 118 providing an identifier of the page associated with the page fault to the back-up process 112 so that the latter can perform a back-up of that page, embodiments are not limited to such an arrangement. Embodiments can be realized in which the page fault handler itself performs the necessary processing to create the back-up copy of the defaulting page and to amend the associated status information 208 accordingly.

It will be appreciated that preferred embodiments realize the above-described elements, that is, the back-up process, the page fault handler and the first process in software. Therefore, embodiments of the present invention are provided in which the software is stored on or in a computer readable medium such as, for example, magnetic or optical discs or ROM, PROMs or the like.

Although the above embodiments have been described with reference to a first process being performed by a single computer system, embodiments are not limited to such an arrangement. Embodiments can be realized in which a cluster of such computer systems is used to perform the first process or respective processes of an overall processing task.

Embodiments of the present invention make reference to creating a backup copy of a portion of memory or portion of data. One skilled in the art understands that the portion can relate to, for example, a page of memory, a predetermined amount of memory such as a 64 k block of memory or some other unit of memory.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings) and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data processing method for saving data stored within a portion of a memory associated with a first process executable by a data processing system; the data processing method comprising the steps of:

executing, using at least one of common resources,
      the first process, with a respective execution priority, to perform a data processing task using a current portion of the memory; and
      a backup process, having a respective execution priority, to create a back-up copy of data stored within the memory during the performance of the data processing task;
   the backup process being executable in response to a predeterminable event associated with the first process;
   the backup process creating a back-up copy of the data in response to the predeterminable event associated with the first process; and
   installing a page fault handler associated with the memory; the page fault handler being responsive to detection of an event associated with a page to save a copy that page and then to allow a write operation to that page.

2. A data processing system for saving data stored within a portion of a memory associated with a first process; the data processing system comprising:

a processor for executing, substantially concurrently or substantially in parallel under control of a scheduler,
   the first process, with a respective execution priority, to perform a data processing task using a current portion of the memory,
   an installer to install a page fault handler associated with the memory; the page fault handler being responsive to detection of an event associated with a page to save a copy that page and then to allow a write operation to that page, and
   a backup process, having a respective execution priority, to create a back-up copy of data stored within the memory during the performance of that data processing task;
   the backup process being executable in response to a predeterminable event associated with the first process; and
   the backup process creating a back-up copy of the data in response to the predeterminable event associated with the first process,
   wherein the first process and the backup process are either in an execution state or a pending state, in which when the first process is in the execution state the backup process is in the pending state, and in which when the first process is in the pending state the backup process is in the execution state.

3. A system as claimed in claim 2 in which the back-up process for creating the back-up copy of the data stored within the memory comprises means for progressively traversing the memory to create a back-up copy of a respective portion of the memory; the respective portion being different to the current portion of the memory used by the first process.

4. A system as claimed in claim 2 further comprising a detector for detecting an event associated with a memory access to the current portion of the memory used by the first process and creating the back-up copy of that current portion of the memory.

5. A system as claimed in claim 4 further comprising means to change a read/write status of the current portion of memory to read-only; and in which the detector for detecting the event comprises means to detect a write attempt to the read-only current portion of memory.

6. A backup method for backing up data associated with a first process; the backup method comprising the steps of:

scheduling and executing both the first process and a first backup process according to respective execution priorities;
   the first backup process comprising progressively backing-up portions of the data in a serial or sequential manner during periods of time associated with inactivity of the first process;
   detecting a write operation in relation to at least one of memory or data currently being used by the first process; and
   backing-up the memory or data currently being used by the first process before allowing the write operation to change the memory or data currently being used by the first process,
   wherein the step of backing-up the memory or data currently being used by the first process comprises the step of responding to an exception generated by a page fault handler and backing up data of a page associated with the exception.

7. A backup method as claimed in claim 6, wherein the first process has performed an operation to which a response is required, and wherein the backup process switches from the pending state to the execution state starting at a time when the read or write operation requested by the first process begins to retrieve data to perform the read or write operation, and wherein the backup process switches from the execution state back to the pending state when all of the data has been retrieved or written into memory for the read or write operation requested by the first process.

* * * * *